P. J. ANDREWS.
COMBINATION LOCK NUT AND LOCKING COLLAR.
APPLICATION FILED JUNE 17, 1912.

1,057,209.  Patented Mar. 25, 1913.

Witnesses
E. J. Ogden
J. L. McDermott

Inventor
Percy J. Andrews.

By Howard E. Barlow
Attorney

UNITED STATES PATENT OFFICE.

PERCY J. ANDREWS, OF PROVIDENCE, RHODE ISLAND.

COMBINATION LOCK-NUT AND LOCKING-COLLAR.

1,057,209.  Specification of Letters Patent.  Patented Mar. 25, 1913.

Application filed June 17, 1912. Serial No. 704,050.

*To all whom it may concern:*

Be it known that I, PERCY J. ANDREWS, a citizen of the United States, and resident of the city of Providence, in the county of Providence and State of Rhode Island, have invented certain new and useful Improvements in Combination Lock-Nuts and Locking-Collars, of which the following is a specification.

This invention relates to the combination of a lock nut, and a coöperating locking collar, and has for its object to provide a nut of this character having a toothed surface, and to also provide a locking collar with a tongue to engage a corresponding keyway on the bolt, said collar being split and provided on one of its ends with a tooth adapted to engage those on the nut with spring pressure whereby the nut is permitted to turn in one direction on the bolt, and to lock it against turning in the opposite direction.

With these and other objects in view, the invention consists of certain novel features of construction, as will be more fully described and particularly pointed out in the appended claims.

Figure 1:
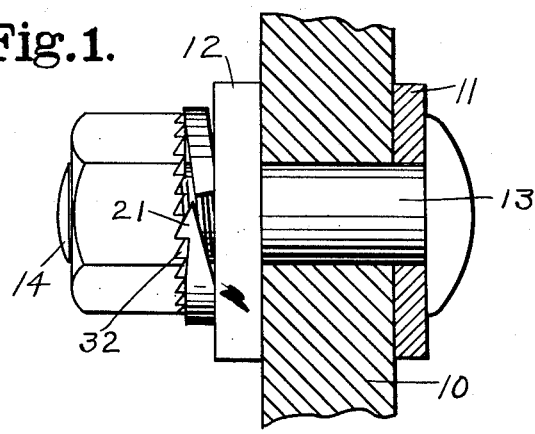
Figure 2:
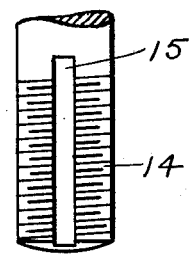
Figure 3:
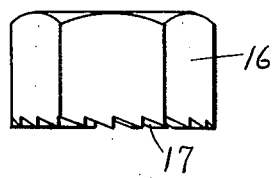
Figure 4:
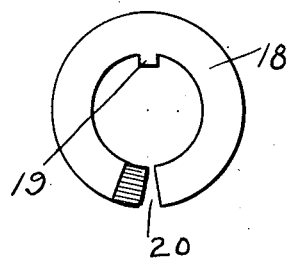
Figure 5:
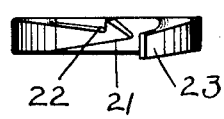

Of the accompanying drawings: Figure 1— is a side elevation of a bolt showing my improved lock nut and collar thereon as securing together a number of members part of which are shown in section. Fig. 2— shows a portion of the bolt and the key way formed therein. Fig. 3— is a side elevation of the nut showing a set of ratchet teeth formed all around its engaging face. Fig. 4— is a plan view of my improved spring split collar the same having a key for engaging the key-way in the bolt, also having a tooth on one of its ends to engage the teeth on the nut. Fig. 5— is an edge view of this collar.

It is found in practice that in many places where the parts bolted together have a constant tendency to work one upon the other, such as in road rails, and vehicles, as cars, automobiles, wagons and the like, that ordinary nuts are continually working loose, releasing said parts causing great annoyance, inconvenience and often much damage. Many devices have been constructed for the purpose of locking or securing the nut to the bolt when it has been screwed thereon. The essential feature of this invention is to provide a device of simple, practical and inexpensive construction that is effective in its operation and that which will permit the nut to be set up tightly into position and be positively locked against a backward or loosening movement.

In carrying out this invention, reference being had to the accompanying drawing, 10 designates one form of work, such as a railroad rail, to which plates 11 and 12 are to be attached for the purpose of securing the two ends of the rails in line with each other. 13 designates the bolt which is threaded at one end 14, said end being provided, as shown in Fig. 2, with a longitudinal keyway or slot 15 extending inward substantially the length of the threaded portion. The nut 16, which is internally threaded to fit onto the said bolt, is provided all around on its under or engaging face, shown in Fig. 3, with ratchet teeth 17. The collar 18 is preferably stamped out of sheet steel having a tongue 19 adapted to fit and slide in the key-way 15. This collar is split at 20, one end 21 being formed with a bevel on its upper face and provided with a tooth 22 adapted to engage the teeth 17 on the nut. The ends of this collar are preferably turned in opposite directions, the tooth portion is turned upward toward the toothed face of the nut and the opposite end 23 is turned downward to rest against the material acted upon so as to crowd or press the opposite or tooth end upward into engagement with the teeth on the nut with spring pressure. This collar after having been properly shaped or formed is preferably hardened.

In assembling these parts, after the bolt has been passed through the material to be secured together, the collar is passed over the end of the bolt and its tongue 19 inserted into the groove. The nut is then screwed into position, its teeth being engaged by the tooth on one end of the collar permits the nut to be set up as hard as desired and positively prevents the nut from loosening or turning backward. If at any time it should be desired to release this nut for the purpose of removing the bolt a screw-driver, or other thin implement, could be wedged in at the point 32 springing the end downward and withdrawing the tooth 21 from its notch and releasing the nut.

An essential feature of my improved construction is that the tooth 22 on the collar is adapted to hook into the opposite corresponding teeth on the bottom of the nut whereby the unloosening strain of the nut tends to draw the ends of the collar together; in other words the teeth on the nut and the teeth on the collar are set to pull against the unscrewing action of the nut. It will be seen that if the action were in the opposite direction, that is to push instead of pull against the unscrewing action of the nut, the ends of the collar would pull apart or separate and soon lose their effectiveness. Another feature of my improved construction is that the toothed end of the collar is beveled or cut away beneath the said tooth so that the full thickness of the collar at this point, including the tooth is a trifle less than the greatest thickness of the body portion of the collar so that in screwing the nut into position over the toothed end of the collar this tooth end may readily recede or move away from the toothed surface of the nut so as to permit this surface to readily pass over the tooth into locked position without in any way injuring the tooth on the collar. If the thickness of the collar through its tooth were not less than that through the body portion the screwing up of the nut with the wrench would quickly shear off this tooth, as it is evident that by such a construction the whole force of the nut in setting up the parts would come directly and entirely upon the tooth instead of coming upon the body of the collar which is designed to receive this force.

I claim:

1. The combination with a bolt having a key-way of a nut threaded on said bolt and having a toothed surface, a split spring collar having a tongue to engage and slide in said key-way, a tooth near one end of said collar having one face beveled toward said end, said toothed end being normally raised from the plane of the collar to engage the teeth on said nut by spring pressure whereby the unscrewing action of the nut causes one of its teeth to engage that of the collar and draw the latter closer about the bolt and lock the nut.

2. The combination with a bolt having a key-way of a nut threaded on said bolt and having a ratchet toothed surface and a spring collar for said bolt having a tongue to engage and slide in said key-way, said collar having a tooth near one end adapted to engage those on said nut with spring pressure to hold the latter from turning backward on said bolt, said tooth having a substantially square faced shoulder extending toward the nut, the same being beveled from the point of the shoulder toward the adjacent end of the collar whereby the unscrewing action of the nut causes one of its teeth to engage that of the collar and draw the latter closer about the bolt and lock the nut, and the body portion of said collar being of a thickness greater than that through its tooth.

In testimony whereof I affix my signature in presence of two witnesses.

PERCY J. ANDREWS.

Witnesses:
 HOWARD E. BARLOW,
 E. I. OGDEN.